(12) United States Patent
Kale et al.

(10) Patent No.: US 6,754,735 B2
(45) Date of Patent: Jun. 22, 2004

(54) SINGLE DESCRIPTOR SCATTER GATHER DATA TRANSFER TO OR FROM A HOST PROCESSOR

(75) Inventors: Prachi Kale, Austin, TX (US); Stephen H. Miller, Round Rock, TX (US); Abraham Prasad, Austin, TX (US); Narender R. Vangati, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 118 days.

(21) Appl. No.: 10/032,029

(22) Filed: Dec. 21, 2001

(65) Prior Publication Data

US 2003/0120835 A1 Jun. 26, 2003

(51) Int. Cl.[7] ................................................. G06F 3/00
(52) U.S. Cl. ............................. 710/33; 710/22; 710/52; 712/12; 711/100
(58) Field of Search ................................. 710/5, 22, 33, 710/52, 74, 54, 57, 107, 23, 4, 31; 707/102; 712/14, 225; 711/100, 113, 147, 173

(56) References Cited

U.S. PATENT DOCUMENTS

| | | | | |
|---|---|---|---|---|
| 5,448,702 A | * | 9/1995 | Carcia, Jr. et al. | 395/325 |
| 6,145,016 A | * | 11/2000 | Lai et al. | 710/4 |
| 6,154,793 A | * | 11/2000 | MacKenna et al. | 710/23 |
| 6,163,820 A | * | 12/2000 | Carrett et al. | 710/33 |
| 6,212,593 B1 | * | 4/2001 | Pham et al. | 710/266 |
| 6,272,499 B1 | * | 8/2001 | Wooten | 707/102 |
| 6,324,597 B2 | * | 11/2001 | Collier | 710/22 |

* cited by examiner

Primary Examiner—Rehana Perveen
Assistant Examiner—Rijue Mai
(74) Attorney, Agent, or Firm—Ryan, Mason & Lewis, LLP

(57) ABSTRACT

A processing system includes a processing device and a host processor operatively coupled to the processing device via a system bus, and implements a scatter gather data transfer technique. The host processor is configurable to control the transfer of information to or from scattered or non-contiguous memory locations in a memory associated with the processing device, utilizing a data structure comprising a single descriptor. An information transfer bandwidth of the system bus is thereby more efficiently utilized than if a separate descriptor were used for transfer of information involving each of the non-contiguous memory locations.

19 Claims, 4 Drawing Sheets

SINGLE DESCRIPTOR SCATTER GATHER DATA TRANSFER TO OR FROM A HOST PROCESSOR

FIELD OF THE INVENTION

The present invention relates generally to processing systems which include one or more devices that interface with a host processor, and more particularly to techniques for transferring data between the host processor and a device of the system.

BACKGROUND OF THE INVENTION

There are many processing system applications in which a processing device of the system interfaces with a host processor. For example, the processing device may be an application-specific integrated circuit (ASIC) designed to perform a given data processing function, and the host processor may be utilized to store and supply data relating to the processing function, to perform computations associated with the processing function, or to program the ASIC with the specific operating parameters required in a given implementation.

A more particular example of a processing device of the type described above is commonly referred to as a network processor. A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards. In this type of arrangement, each of the line or port cards will generally include a host processor, and the host processor of a given line or port card can be utilized to direct the storage of data in and retrieval of data from a host memory, to perform computations on behalf of the network processor, and to configure the network processor for particular operating parameters.

A host processor typically communicates with an associated network processor or other processing device through the use of a standard communication bus architecture, such as the well-known Peripheral Component Interconnect (PCI) bus described in, e.g., PCI Local Bus Specification, Rev. 2.2, which is incorporated by reference herein.

There are a number of significant problems with conventional communication bus architectures such as the above-noted PCI bus. For example, the utilization of the available bus bandwidth tends to be inefficient in many applications. In addition, excessively large memory allocations are often require to implement the above-noted transfer of packets or other data to and from the host memory. Another problem in the packet transfer context is that previous techniques typically require a certain byte alignment, which may unduly limit the byte size of the packets that may be transferred.

It is therefore apparent that a need exists for improved techniques for implementing data transfers between a host processor and a network processor or other processing device in a manner which alleviates one or more of the above-noted problems.

SUMMARY OF THE INVENTION

The invention provides improved techniques for transferring data between a host processor and a processing device in a data processing system.

In accordance with one aspect of the invention, the processing system includes a processing device and a host processor operatively coupled to the processing device via a system bus, and implements a scatter gather data transfer technique. The host processor controls the transfer of information to or from scattered or non-contiguous memory locations in a memory associated with the processing device, utilizing a data structure comprising a single descriptor. The information to be transferred is characterized by address and data information stored in a specified region of a host memory associated with the host processor. The non-contiguous memory locations associated with the processing device may be non-contiguous memory locations in a target block memory or a set of configuration registers in an internal memory of the processing device. The single descriptor scatter gather technique allows an information transfer bandwidth of the system bus to be more efficiently utilized than if a separate descriptor were used for transfer of information involving each of the non-contiguous memory locations.

In accordance with another aspect of the invention, the scatter gather data transfer is implemented using a descriptor table stored in a memory of the host processor and defined by a descriptor head pointer and a descriptor tail pointer. The descriptor table may include multiple descriptor entries, each of the entries defining a particular region of the host memory associated with a corresponding descriptor. The particular region of the host memory associated with the corresponding descriptor is utilized in implementing a data transfer between the host processor and the processing device in accordance with that descriptor. The descriptor table is generated under the control of one or more software programs executable by the host processor.

The processing device may be a network processor configured to provide an interface between a network and a switch fabric in a router or switch.

Advantageously, a scatter gather data transfer in accordance with the invention is implemented using only a single descriptor, which reduces congestion on the system bus, thereby improving the efficiency of the bus bandwidth utilization, while also overcoming one or more of the other problems associated with conventional data transfer techniques.

DETAILED DESCRIPTION OF THE INVENTION

The invention will be illustrated herein in conjunction with an exemplary host processor interface particularly well-suited for use with a network processor. It should be understood, however, that the invention is more generally applicable for use in improving data transfer between any host processor and one or more associated processing devices.

The terms "processing device" and "processor" as used herein are intended to include, by way of example and without limitation, network processors, microprocessors, central processing units (CPUs), digital signal processors (DSPs), application-specific integrated circuits (ASICs), and other types of data processing devices, as well as portions and combinations of these and other devices.

The present invention in an illustrative embodiment provides improved data transfer between a host processor and one or more associated processing devices through the use of a single descriptor scatter gather technique. Advantageously, this technique allows a single descriptor to be used to control the transfer of data to or from multiple non-contiguous memory locations, such that bus bandwidth between the host processor and the one or more processing devices is more efficiently utilized.

Figure 1:
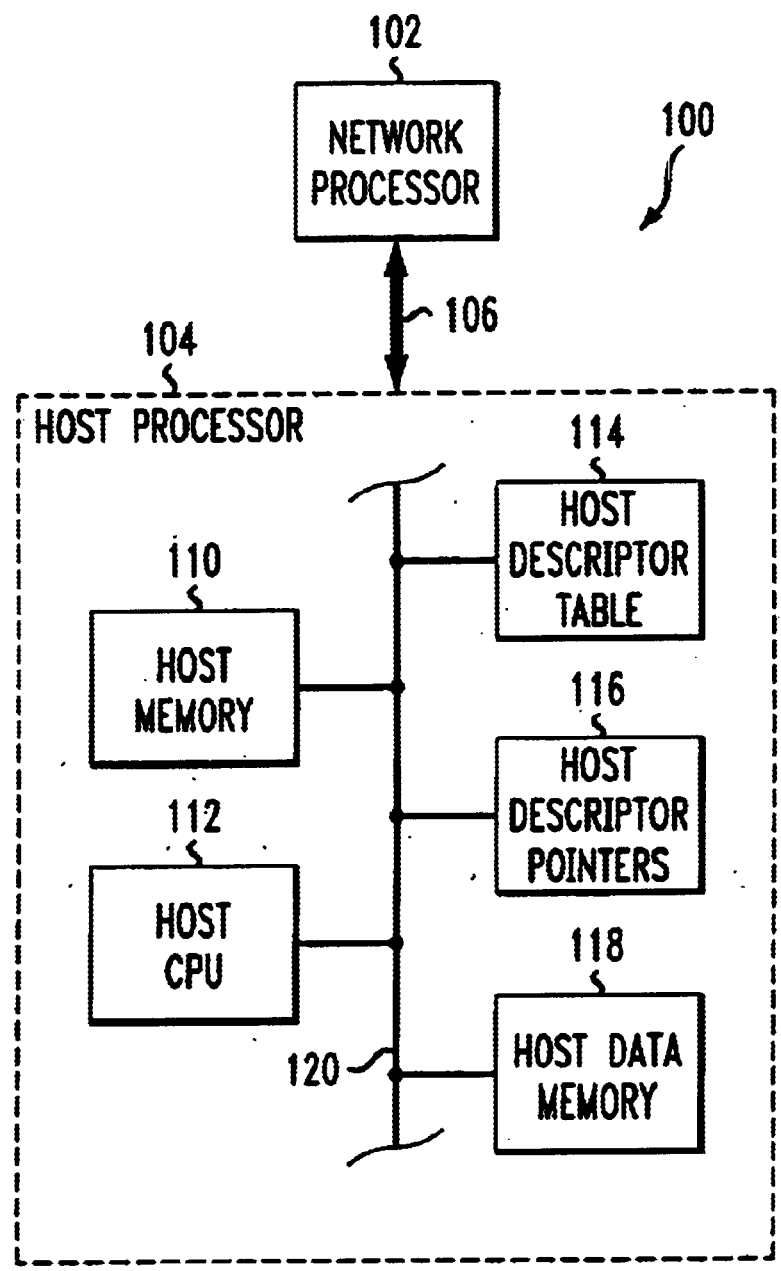
FIG. 1 is a simplified block diagram of a processing system in which the present invention is implemented.

FIG. 1 shows a processing system 100 in which the invention is implemented. The system 100 includes a network processor 102 coupled to a host processor 104 over a system bus 106. The system bus 106 may be, e.g., a peripheral component interconnect (PCI) bus of the type described in the above-cited PCI Local Bus Specification, Rev. 2.2. However, the invention does not require use of the PCI bus, and other buses or communication media may be used in conjunction with the invention.

In an example processing application of the system 100, the network processor 102 may be configured to provide an interface for communication of packets or other data between a network and a switch fabric of a router or switch.

The network processor 102 and the host processor 104 may each be implemented, e.g., as one or more integrated circuits installed on a line or port card of a router or switch.

As shown in FIG. 1, the host processor 104 includes a host memory 110, a host CPU 112, a host descriptor table 114, host descriptor pointers 116 and a host data memory 118, all of which are coupled to a host processor internal bus 120. Although the host memory 110, host descriptor table 114, host descriptor pointers 116 and host data memory 118 are shown as separate elements in the figure, this is for simplicity and clarity of illustration only, and one or more of these elements may represent different portions of a single host processor memory, different portions of two or more host processor memories, as well as other configurations of register banks or other internal or external storage devices. For example, the host descriptor table 114, host descriptor pointers 116 and host data memory 118 may each be elements of the host memory 110. The term "host memory" as used herein is intended to include a host data memory or one or more of the other memory-related elements of the host processor 104.

It should be understood that the particular arrangement of system elements shown in FIG. 1 is by way of illustrative example only. More particularly, as previously noted, the invention can be implemented in any type of processing system, and is not limited to any particular data processing application. In addition, the host processor 104 may include one or more additional elements not shown in the figure, e.g., a bus controller or controllers.

Figure 2:
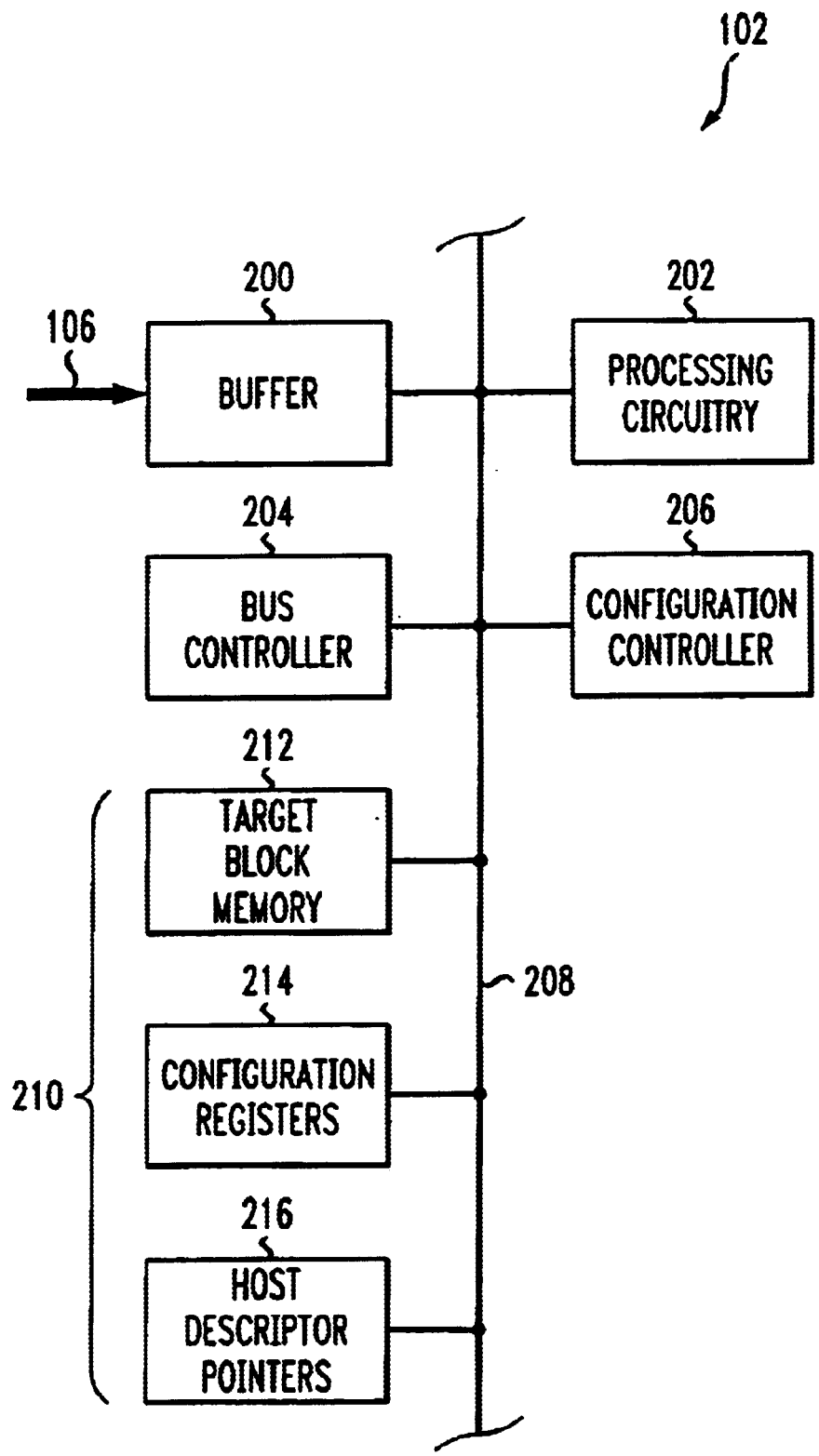
FIG. 2 shows a more detailed view of an exemplary network processor suitable for use as a processing device in the FIG. 1 system.

FIG. 2 shows the network processor 102 of FIG. 1 in greater detail. The network processor 102 in this embodiment includes a buffer 200 which receives packets or other data from the system bus 106. The network processor 102 further includes processing circuitry 202, a bus controller 204, a configuration controller 206, and memory circuitry 210 comprising a target block memory 212, a set of configuration registers 214, and a set of host descriptor pointers 216. Each of these elements is shown as coupled to an internal network processor bus 208.

As previously stated above with regard to the host processor memory elements, although the buffer 200, target block memory 212, configuration registers 214 and host descriptor pointers 216 of network processor 102 are shown as separate elements in FIG. 2, one or more of these elements may represent different portions of a single network processor memory, different portions of two or more network processor memories, as well as other configurations of register banks or other internal or external storage devices.

The operation of the system 100 in implementing the above-noted single descriptor scatter gather technique will now be described with reference to FIGS. 3 and 4.

Figure 3:
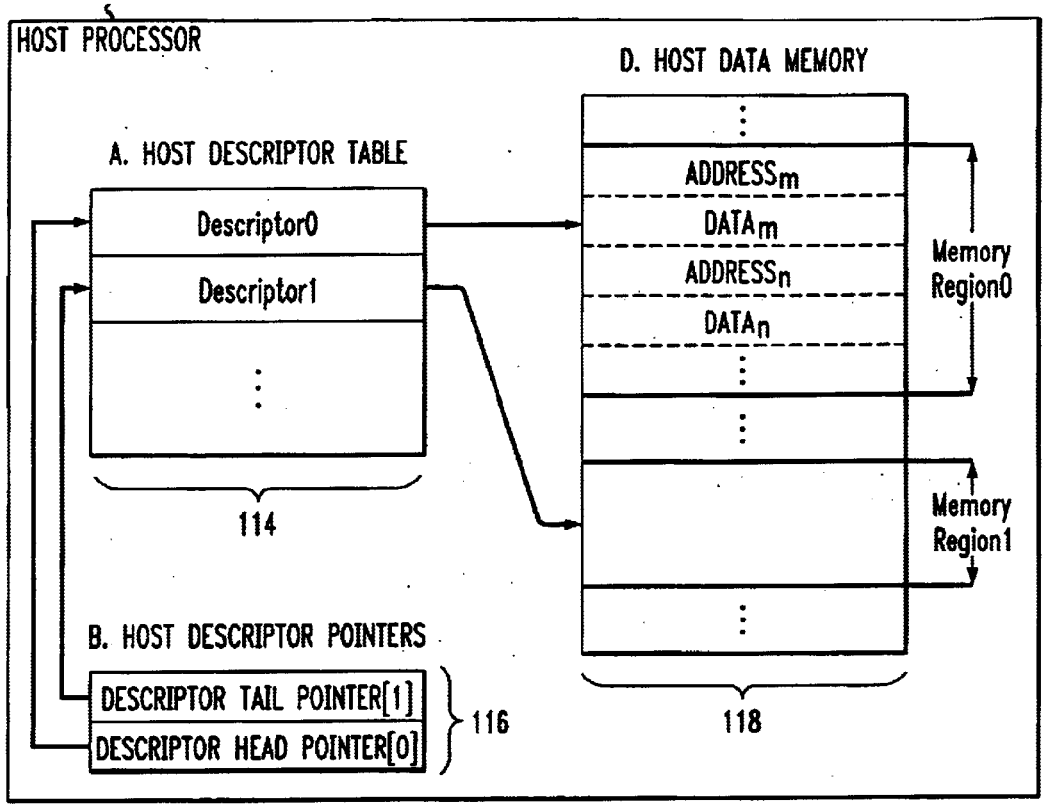
FIG. 3 illustrates the transfer of data between the host processor and network processor of the FIG. 1 system in accordance with a single descriptor scatter gather technique of the present invention.

Referring initially to FIG. 3, a diagram is shown which illustrates a single descriptor scatter gather technique implemented using the network processor 102 and the host processor 104. The single descriptor scatter gather technique in this embodiment is illustrated using the host descriptor table 114, host descriptor pointers 116 and host data memory 118 of the host processor 104, as well as target block memory and/or configuration registers 212, 214 and host descriptor pointers 216 of the network processor 102. The technique is illustrated in the FIG. 3 diagram as including steps A, B, C, D and E, each of which is described in greater detail below.

In step A, one or more software programs running on the host processor 104 build the host descriptor table 114. As indicated previously, although shown as a separate element in FIG. 1, the host descriptor table 114 may be built within the host memory 110 of the host processor 104. The example host descriptor table 114 shown in FIG. 3 includes multiple descriptors, denoted Descriptor0, Descriptor1, etc. Each of the descriptors in the host descriptor table 114 defines a particular region of the host data memory 118. As shown in the figure, the descriptors Descriptor0 and Descriptor1 define Memory Region0 and Memory Region1, respectively. The descriptors may be 16-byte descriptors, although other descriptor sizes may also be used. A given descriptor preferably includes a data transfer length which specifies the length of its corresponding region in the host data memory 118. An example configuration for a descriptor will be described in conjunction with FIG. 4 below.

The host descriptor table 114 is defined by the host descriptor pointers 116, which in this embodiment include a descriptor head pointer denoted Descriptor Head Pointer[0] and which points to Descriptor0, and a descriptor tail pointer denoted Descriptor Tail Pointer[1] and which points to Descriptor1. The descriptor head and tail pointers are stored in both the network processor as indicated at 216 and in the host processor as indicated at 116. The host processor 104 is responsible for maintaining the descriptor head pointer.

In step B, after the software has built the descriptor table 114, the host processor 104 updates its own local copy of the descriptor head pointer to point to the first valid descriptor in the host descriptor table 114, and also writes this value to the descriptor head pointer in the set of pointers 216 of the network processor 102.

The descriptor tail pointer as stored in the host processor 104 is preferably updatable under the control of the network processor 102 such that the network processor can provide an indication to the host processor that all descriptors in the descriptor table 114 have been processed, e.g., by the network processor setting the descriptor tail pointer stored in the host processor 104 to that of the descriptor head pointer.

A particular region of the host data memory 118 associated with a corresponding descriptor generally includes at least an address for each of a number of non-contiguous memory locations in the target block memory 212 or configuration registers 214, and may include both an address and data for each of the non-contiguous memory locations. For example, with reference to Memory Region0 in the host data memory 118, this region includes addresses and data associated with different non-contiguous memory locations in one or more of the memory elements 212, 214 of the network processor 102. More specifically, Memory Region0 includes Address$_m$ and Data$_m$ for a first memory location in the memory elements 212, 214 of the network processor 102, and Address$_n$ and Data$_n$, for a second memory location in the memory elements 212, 214 of the network processor 102, where the first and second memory locations identified by the respective addresses Address$_m$ and Address$_n$ are non-contiguous memory locations. A given region can include more than two address and data entries, as is illustrated generally for the Memory Region0 in the host data memory 118 of FIG. 3.

One or more of the data entries in a given region of the host data memory 118 may each comprise, e.g., data to be transferred from the host data memory 118 to the memory location in the network processor 102 identified by the corresponding address. It is also contemplated that in other embodiments one or more of the data entries may comprise data that is to be transferred from a memory location in the host processor 102 identified by the corresponding address to the host data memory 118. In other words, the present invention is not limited to a particular direction of data transfer between the network processor 102 and the host processor 104.

In step C, the network processor 102 detects that the descriptor head and tail pointers as stored in the set of pointers 216 are not equal, and begins processing the descriptor table 114.

In step D, the network processor 102 reads the first valid descriptor entry from the table 114, as identified by the current value of the descriptor head pointer. In the current example, this is Descriptor0 identified by Descriptor Head Pointer[0]. The network processor 102 then performs a burst read from the host data memory 118 based on the data transfer in the descriptor. The descriptor is then further processed based on the transfer type, target address and other information contained therein. As indicated above, the particular information contained in an example descriptor in accordance with the present invention is illustrated in FIG. 4.

In step E, after fetching the actual addresses and data from the host data memory 118, the network processor 102 performs the appropriate data transfers to the scattered or non-contiguous target memory locations in memory elements 212, 214. Advantageously, this scatter gather data transfer is implemented using only a single descriptor, which reduces congestion on the system bus 106, and overcomes one or more of the above-identified problems associated with conventional data transfer techniques.

For each descriptor that has been processed in the manner described above and illustrated in FIG. 3, the network processor 102 updates its local copy of the descriptor tail pointer in the set of tail pointers 216, and also performs a write to the descriptor tail pointer in the set of pointers 116 in the host processor 104. At any time during the processing of a given host descriptor table, the host processor 104 has the option of polling its local copy of the descriptor tail pointer to monitor the number of descriptors that have been processed by the network processor 102. As noted above, when the network processor has completed processing all valid descriptors in the host descriptor table 114, the descriptor tail pointer and descriptor head pointer in the set of pointers 216 match, and the network processor 102 does a final update of the descriptor tail pointer in the set of pointers 116 in the host processor 104. At this point, the network processor 102 has detected that there are no further valid descriptors to be processed, and the host processor has been informed that the network processor has completed the processing of the descriptor table.

Figure 4:
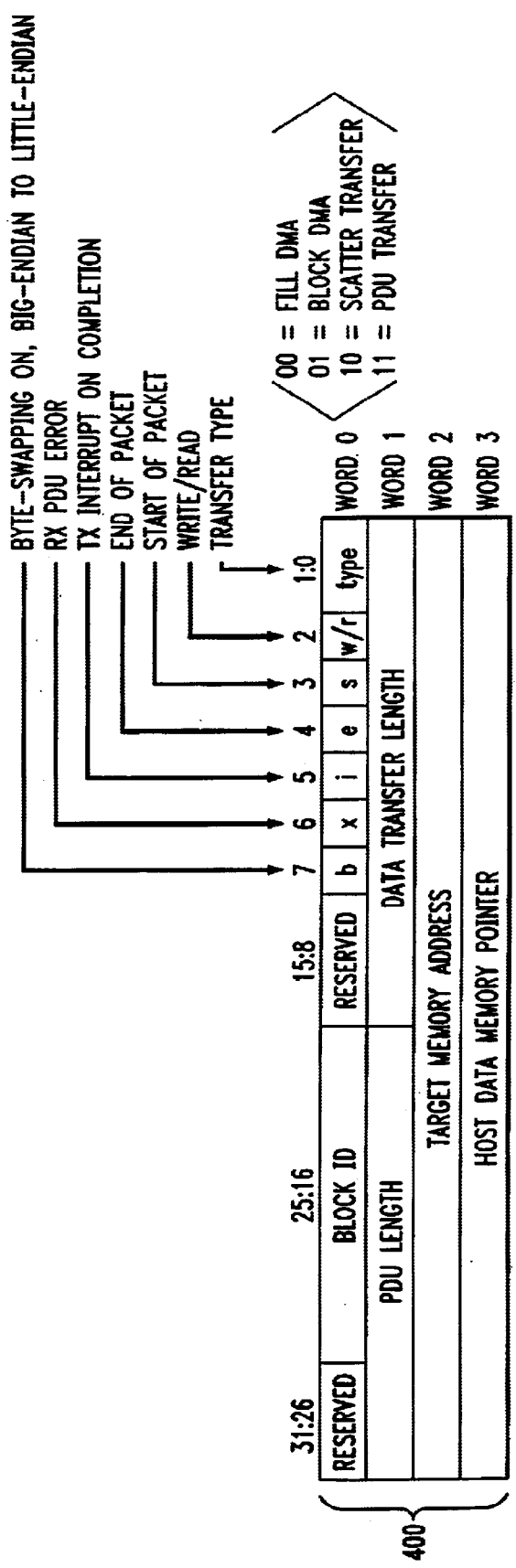
FIG. 4 shows the format of a single descriptor that may be utilized for scatter gather data transfer between the host processor and the network processor of the FIG. 1 system in accordance with the invention.

FIG. 4 shows an example descriptor format suitable for use in conjunction with the present invention. The network processor 102 may be configured with conventional decoding circuitry in order to provide decoding of this descriptor format. Such decoding circuitry may be of a type well-known in the art, and is therefore not further described herein.

In the example descriptor format of FIG. 4, a given descriptor 400 comprises four 32-bit words, denoted word 0, word 1, word 2 and word 3. Word 0 is the header of the descriptor and includes the following fields:

1. Transfer type, a 2-bit field which takes on the values 00, 01, 10 and 11 to indicate respective fill direct memory access (DMA), block DMA, scatter gather and protocol data unit (PDU) transfers. A PDU corresponds generally to a packet in a packet processing application of the invention.

2. Write/read indicator, indicating if the transfer is a write/read transaction. For all write transfers, the starting memory location in the host data memory contains an address. In a DMA mode, the address is followed by the data.

3. Start of packet (SOP) indicator in case of PDU transfer.

4. End of packet (EOP) indicator in case of PDU transfer.

5. Transmit interrupt on completion indicator.

6. Received PDU error indicator in case of PDU transfer.

7. Byte-swapping indicator, indicating if big-endian to little-endian byte swapping is on.

7. Reserved field.

8. Block identifier (ID), denoting an address of the destination target block or configuration register array.

9. Reserved field.

Word 1 includes a PDU length field and a field specifying the previously-mentioned data transfer length. In the case of a PDU transfer from the network processor to the host processor, the PDU length will contain the length of the PDU in bytes. For write/read transactions or PDU transfer from the host processor 104 to the network processor 102, the data transfer length field contains the data transfer length in bytes.

Word 2 contains the target memory address, i.e., specifies the starting address of the target memory location in the network processor 102 that data to be transferred from the host processor will be fetched into.

Word 3 is a host data memory pointer, which points to the start of the host data memory from where the data transfer will begin.

It should be appreciated that the FIG. 4 descriptor format is shown by way of example only, and other descriptor formats can be used to implement the present invention. For example, hierarchical descriptor formats may be used.

As indicated above, the single descriptor scatter gather technique of the illustrative embodiment provides a number of significant advantages over conventional techniques. For example, it makes the system bus utilization very efficient, it frees the host processor from tracking the descriptor tail pointer, and it can be used to support PDU transfer between the host processor and the network processor. Moreover, the technique is very efficient in terms of software memory allocation, in that software does not need to allocate large amounts of memory for implementing PDU transfer. Furthermore, when transferring PDUs from the host processor to the network processor, these PDUs need not be aligned at any particular byte boundary, such as an 8-byte boundary. Instead, the software can transfer PDUs having any byte size. Another advantage is that any target block or configuration register in the network processor is made accessible in an efficient manner to software running on the host processor.

The above-described embodiments of the invention are intended to be illustrative only. For example, although the illustrative embodiment of FIGS. 1 and 2 utilizes a network processor suitable for processing packets or other PDUs, the invention can be used to implement scatter gather data transfers in a general-purpose processing device. In addition, the particular memory elements and other processing elements shown in network processor 102 and host processor 104 in FIGS. 1, 2 and 3 may be combined or reconfigured using any desired arrangement of internal or external memories or other storage devices. These and numerous other alternative embodiments within the scope of the following claims will be apparent to those skilled in the art.

What is claimed is:

1. A processing system comprising:
   a processing device; and
   a host processor operatively coupled to the processing device via a system bus;
   wherein the host processor is configurable to control the transfer of information at least one of to and from a plurality of non-contiguous memory locations in a memory associated with the processing device, utilizing a data structure comprising a single descriptor, an information transfer bandwidth of the system bus thereby being more efficiently utilized than if a separate descriptor were used for transfer of information involving each of the non-contiguous memory locations.

2. The processing system of claim 1 wherein the single descriptor data structure comprises a scatter gather descriptor data structure.

3. The processing system of claim 1 wherein the plurality of non-contiguous memory locations associated with the processing device comprise at least one of a target block memory and a set of one or more configuration registers in an internal memory of the processing device.

4. The processing system of claim 1 wherein information to be transferred is characterized by address and data information stored in a specified region of a host memory associated with the host processor.

5. The processing system of claim 1 wherein a host memory associated with the host processor stores at least one descriptor table, the descriptor table comprising a plurality of entries, each of the entries defining a particular region of the host memory associated with a corresponding descriptor, a particular region of the host memory associated with the corresponding descriptor being utilizable in implementing a data transfer between the host processor and the processing device in accordance with that descriptor.

6. The processing system of claim 5 wherein the descriptor table is generatable under the control of one or more software programs executable by the host processor.

7. The processing system of claim 5 wherein the descriptor table is defined by at least a descriptor head pointer and a descriptor tail pointer.

8. The processing system of claim 7 wherein the descriptor head pointer and the descriptor tail pointer are stored in both the processing device and the host processor.

9. The processing system of claim 8 wherein at least the descriptor tail pointer as stored in the host processor is updatable under the control of the processing device such that the processing device can provide an indication to the host processor that all descriptors in the descriptor table have been processed by setting the descriptor tail pointer stored in the host processor to that of the descriptor head pointer.

10. The processing system of claim 5 wherein the particular region of the host memory associated with a corresponding descriptor comprises at least an address for each of the non-contiguous memory locations in the memory associated with the processing device.

11. The processing system of claim 10 wherein the particular region of the host memory associated with a corresponding descriptor comprises, for each of at least a subset of the non-contiguous memory locations in the memory associated with the processing device, data to be transferred from the host memory to the memory location identified by the address.

12. The processing system of claim 1 wherein the particular configuration of the descriptor is selectable based upon the particular type of data transfer to be performed.

13. The processing system of claim 12 wherein the different descriptor configurations vary in terms of configuration of one or more of a reserved field, a transfer length field, a block number field, a subblock number field and an address field.

14. The processing system of claim 1 wherein the system bus through which the host processor is coupled to the processing device comprises a peripheral component interconnect (PCI) bus.

15. The processing system of claim 1 wherein the processing device comprises a network processor.

16. The processing system of claim 1 wherein at least one of the processing device and the host processor is implemented as an integrated circuit.

17. An apparatus for use in transferring data involving a processing device of a processing system, the apparatus comprising:
   a host processor operatively coupled to the processing device via a system bus;
   wherein the host processor is configurable to control the transfer of information at least one of to and from a plurality of non-contiguous memory locations in a memory associated with the processing device, utilizing a data structure comprising a single descriptor, an information transfer bandwidth of the system bus thereby being more efficiently utilized than if a separate descriptor were used for transfer of information involving each of the non-contiguous memory locations.

18. A method for use in transferring data between a processing device and a host processor over a system bus in a processing system, the method comprising the step of:
   controlling the transfer of information at least one of to and from a plurality of non-contiguous memory locations in a memory associated with the processing device;
   wherein the transfer is controllable utilizing a data structure comprising a single descriptor, an information transfer bandwidth of the system bus thereby being more efficiently utilized than if a separate descriptor were utilized for transfer of information involving each of the non-contiguous memory locations.

19. A processing device couplable to a host processor over a system bus, the processing device comprising:

control circuitry operative to determine a particular type of information transfer to be performed involving a plurality of non-contiguous memory locations in a memory associated with the processing device, the transfer to be performed between the processing device and the host processor over the system bus;

wherein the transfer is controllable utilizing a data structure comprising a single descriptor, an information transfer bandwidth of the system bus thereby being more efficiently utilized than if a separate descriptor were utilized for transfer of information involving each of the non-contiguous memory locations.

* * * * *